A. G. M. MICHELL

April 16, 1929. CRANKLESS MECHANISM Re. 17,273

2 Sheets-Sheet 1

Original Filed Sept. 22, 1924

Inventor
Anthony G. M. Michell
By Henry Orth Jr.
Atty.

April 16, 1929. A. G. M. MICHELL Re. 17,273

CRANKLESS MECHANISM

2 Sheets-Sheet 2

Original Filed Sept. 22, 1924

Inventor
Anthony G. M. Michell.
By Henry Orth Jr
Atty.

Reissued Apr. 16, 1929. Re. 17,273

UNITED STATES PATENT OFFICE.

ANTHONY G. M. MICHELL, OF MELBOURNE, AUSTRALIA, ASSIGNOR, BY MESNE ASSIGNMENTS, TO MICHELL-CRANKLESS ENGINES CORPORATION, OF NEW YORK, N. Y., A CORPORATION OF NEW YORK.

CRANKLESS MECHANISM.

Original No. 1,613,116, dated January 4, 1927, Serial No. 739,110, filed September 22, 1924, and in Australia October 15, 1923. Application for reissue filed January 3, 1929. Serial No. 330,065.

The present invention relates to swash-plate mechanism which may be of the slipper and slant type described in my Australian Patent 4,627 of 1917, such mechanism comprising a slant having a plane face oblique to the shaft, co-operating with reciprocating pistons in such manner that the latter reciprocate with a pure harmonic motion.

The object of the present invention is to provide a swash-plate mechanism comprising two swash-plates revolving relatively to multiple pistons arranged in pairs, the two pistons of each pair being in different phases of reciprocating motion in the manner and for the purpose hereinafter set out.

In the accompanying drawings, swash-plate mechanism according to this invention is shown in diagrammatic form, being illustrated by way of example, as applied to an internal combustion engine operating on a two stroke cycle.

Figure 1:
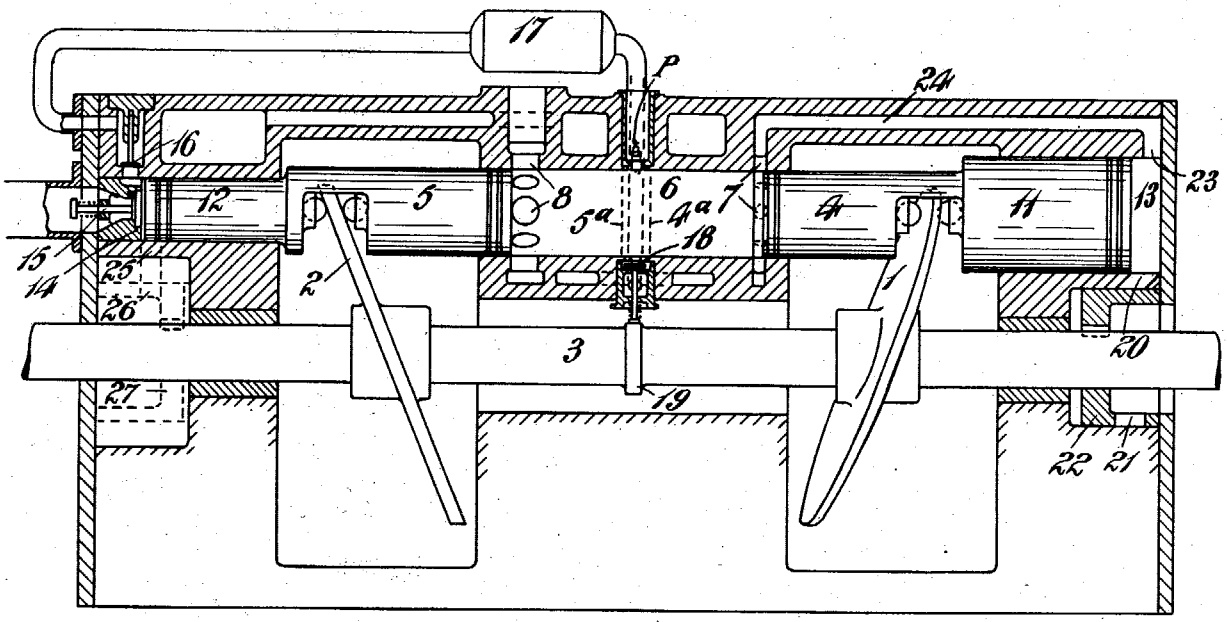
Figure 2:
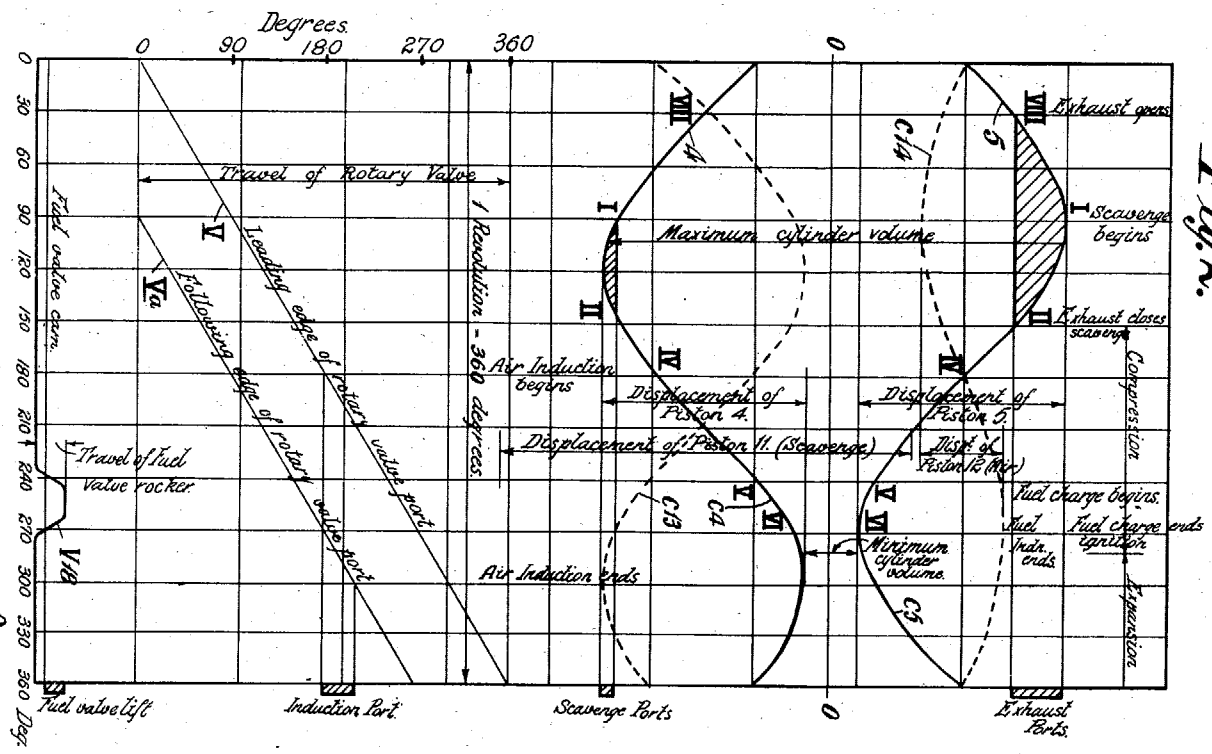

Figure 1 is a longitudinal section, in outline, of such an engine, while Figure 2 is a phase-diagram showing the relative positions of the piston elements at different phases of the cycle of operation.

It is to be understood that a complete engine will usually be arranged as above stated with multiple pistons, that is to say will comprise a plurality of pairs of pistons such as that shown in Figure 1. The swash-plates 1, 2, revolving with the shaft 3, and mounted thereon in approximately opposite phases, will operate in conjunction with all of said pairs of pistons.

Each swash-plate, or slant, is mounted obliquely upon the shaft of the engine, that is to say, is inclined thereto at an angle different from a right angle, and is symmetrical with respect to its line of greatest inclination with the shaft. In consequence of such symmetrical construction the piston in coaction with each slant moves at equal but opposite speeds at the corresponding points of its forward and return motions.

The swash-plates 1, 2, are respectively in operative relation with the main pistons 4 and 5 which reciprocate in the explosion cylinder 6 in approximate opposition to each other. These pistons 4, 5, form one of the "pairs" of pistons referred to above as characteristic of the construction. As shown in Figure 1, the piston 5 being at the extreme end of its stroke, the piston 4 will have nearly, but not completely reached the corresponding end of its stroke, that is to say its maximum distance from the piston 5. The cylinder 6 has at its ends two series of ports 7, 8, which are uncovered by the ends of the pistons 4 and 5, as the latter reach the outer ends of their respective strokes. At the opposite or inner ends of the strokes the pistons 4, 5, reach the positions shown by dotted lines $4^a$, $5^a$, respectively near the middle of the length of the cylinder 6.

Connected respectively to the main pistons 4, 5, and reciprocating therewith are the auxiliary pistons 11, 12, working respectively in the cylinders 13, 14, which are co-axial with the explosion cylinder 6. The piston 11 and cylinder 13 constitute an air-pump which serves to deliver air for scavenging and combustion in the cylinder 6. The piston 12 and cylinder 14 serve to inject the fuel, with or without an admixture of air for combustion into the cylinder 6. With regard to the cylinder 14, it will be assumed in the description below that the fuel is gaseous, induction taking place from the source of supply through the valve 15 into the cylinder 14, and delivery therefrom through the automatic valve 16 into the fuel receiver 17, and thence at the appropriate phase of the cycle into the working cylinder 6 through the valve 18 operated by the cam 19 on the shaft 3. A modification suitable for adapting the cylinder 14 of a multiple-piston engine to operate on the Diesel-engine cycle, with liquid fuel, will be indicated hereinafter. Admission of the scavenging air to cylinder 13 may be through a port 20 communicating with the atmosphere through port 21 on the rotary valve 22 on the shaft 3 at the appropriate period of the cycle and delivery of the scavenging air takes place through the port 23 which communicates through the conduit 24 with the ports 7.

The sequence of operations of the system is set out in the diagram, Figure 2, which represents the events of one revolution of the shaft 3. The sinusoidal curves $C_4$, $C_5$, in this diagram represent respectively the displacements of the main pistons 4, 5, shown in Figure 1, the line O, O, corresponding to the middle line of the cylinder 6, represented by the same symbols in Figure 1. Thus the vertical distance between the two curves 4, 5, at any instant of the revolution represents the total volume of the working fluid in the cylinder 6 at that instant. It will be observed as shown in the drawings that the displacement of piston 4 is later in phase than that if the piston 5, by an angle corresponding to the supplement of the angle by which the swash-plate 1 is mounted on the shaft to the rear of the swash-plate 2, namely, as shown in the diagram Figure 2, by an angle of 30 degrees.

The vertical line I, I in Figure 2, corresponds to the phase of the revolution when the moving parts of the engine are in the respective positions in which they are represented in Figure 1. Thus as a consequence of the swash-plate 1 being later in phase than the swash-plate 2, and of the ports 7 being of smaller axial length than the ports 8, the scavenging ports 7 are at this stage only on the point of being uncovered by the end of the piston 4, while the exhaust ports 8 are fully open having been uncovered at an earlier phase by the end of the piston 5. It will be understood that by suitable selection of the axial dimensions of the ports 7 and 8, and by relatively slight variations of their axial positions relatively to the strokes of the pistons 4 and 5, substantially the same operative effects may be secured, with a pair of slants exactly, instead of approximately, opposed in phase; also that, in order to render the engine adaptable to different varieties of fuel or to varying conditions of operations, means may be provided for adjusting the phase of either of the slants relatively to the other and to the valves. The pressure of the products of combustion in the cylinder 6 being this instant reduced nearly to atmosphere pressure, and the scavenging piston 11 performing its compression stroke, the scavenging air will displace and expel the remaining gases upon the opening of the scavenge ports 7. At the phase I, I the exhaust ports 8 are closed by the piston 5 returning over them and at the same time or shortly afterwards scavenge ports 7 are similarly closed by the piston 4. After the closing of the scavenge ports the compression in the cylinder 6 proceeds by the return of the pistons 4 and 5 towards the middle plane O, O, but the air enclosed in the cylinder 13 expands down to or slightly below atmospheric pressure at the opening of the induction port 20 at the phase IV, IV.

The remainder of the cycle in the cylinder 13 is shown in Figure 2 by the dotted sinusoidal curve C, 13, which is opposite in phase to C, 4, together with lines V, and $V_a$, which represent respectively the travel of the leading and following edges of the port 21 of the rotary valve 22, with respect to the induction port 20 whose relative position is indicated on the right-hand side of the diagram. It will be seen that the induction ends, at the end of the inward stroke of pistons 4, and that compression of the air enclosed in the cylinder 13 and conduit 24 then proceeds until the opening of the scavenge ports at I, I in the succeeding cycle.

The cycle of the cylinder 14 is similarly shown by the dotted sinusoidal curve C, 14, opposite in phase to C, 5, together with the line V, 18, which represents the phases of the cam 19 relatively to the travel of the fuel-valve 18 as indicated at the right-hand side of the diagram. It will be seen that induction of the fuel into the cylinder 14 takes place through the valve 15 during the stroke of the piston 12 which begins at I I, compression through the valve 16 into the reservoir 17 proceeding during the remaining half of the cycle. At V V shortly before the piston 5 reaches the end of its compression stroke the fuel valve 18 is opened by the cam 19, and remains open until the end of the stroke of piston 5 at VI, the fuel being fed into the working cylinder 6 during the period V, VI, against the increasing pressure of the air in the cylinder.

Returning to the action of the main pistons 4, 5 (as shown by the curves $C_4$ and $C_5$) it will be seen that they compress the working fluid to its minimum volume at a phase slightly after the end of the stroke of the piston 5 and before the end of the stroke of piston 4. This position is indicated approximately on Figure 2 by the line designated "Minimum cylinder volume". Ignition of the charge, by usual means, as by a sparkling plug P, is effected at or about the phase of minimum volume, and the expansion or power stroke proceeds as the pistons 4 and 5 move apart, until the exhaust ports 8 open at the phase VIII, VIII. Exhaust of the gases of combustion then proceeds to the phase I, I, of the next cycle, when the sequence of operations above described is repeated.

It is to be understood that the invention is not necessarily restricted to a construction including auxiliary pistons, such as 11 and 12 connected to all the main pistons 4 and 5 as the necessary operations of scavenging, fuel injection or the like may in some cases be effected by auxiliary pistons attached to only some of said main pistons.

In the application of the invention to Diesel engine operating on liquid fuel, the cycle of operations and the arrangement of the parts will be similar to those above described, excepting that the piston 12 and cylinder 14 instead of compressing gaseous fuel, may be employed either to compress air for the purpose of air-injection of the fuel, or as a pump to deliver the liquid fuel directly into the working cylinder, through a fuel injection valve replacing and operating in the same way as the valve 18. When two or more cylinders 14 in a multiple cylinder Diesel engine are employed as air-compressors, it will be convenient to arrange them in a series as a multi-stage compressor.

In such an arrangement the cylinder effecting the first stage of the compression will preferably take in air from the atmosphere through a cylinder port 25 and valve port 26 in a rotary valve 27 similarly to the rotary valve 22, these parts being indicated by dotted lines in Figure 1. Such induction of air will take place during the inward stroke of the piston 12, delivery of the compressed air occurring in the latter part of the return stroke when the piston of the next compression stage (which is a piston in advance of the first-stage piston in the engine cycle) uncovers admission ports similar to the ports 7.

I claim:

1. In a crankless engine of the type specified, the combination of a main shaft, a pair of plane-faced slant members mounted thereon with different phases of inclination one being slightly retarded from direct opposition to the other, a working cylinder, and two pistons in said cylinder each of which coacts with one of said slant members.

2. In a crankless engine of the type specified, the combination of a main shaft, a pair of plane-faced slant members mounted thereon in phases differing from precise opposition, a working cylinder having exhaust and scavenge ports, and two pistons co-acting severally with each of said slant members and arranged in an alined pair reciprocable in the cylinder, one piston of the said pair effecting the operation of exhaust by uncovering said exhaust ports, and the other piston effecting the operation of scavenge by uncovering said scavenge ports during a period shorter than and retarded with respect to the period of uncovering of said exhaust ports.

3. In a crankless engine, the combination with a main shaft, of a pair of slant members mounted thereon, with different phases of inclination, pistons co-acting with each of said slant members and arranged in alined pairs for reciprocation in opposed phases, a working cylinder common to said pistons in which the latter reciprocate and having valve ports controlled by said pistons a pump cylinder for supplying scavenging air communicating with the working cylinder, a rotary inlet valve operable by the main shaft controlling the inlet port of the pump cylinder, and a piston in the latter forming an extension of one of the engine pistons.

4. In a crankless engine, the combination with a main shaft, of a pair of slant members mounted thereon with different phases of inclination, a working cylinder, pistons in the latter co-acting with each slant member, a fuel injecting pump adapted to communicate with said cylinder and including an auxiliary piston connected with one of the engine pistons, and a fuel inlet valve in the latter operable by the main shaft.

5. In a crankless engine, the combination with a main shaft, of a pair of slant members mounted thereon with different phases of inclination, a working cylinder, pistons in the latter co-acting with each slant member, a fuel injecting pump adapted to communicate with said cylinder and including an auxiliary piston connected with one of the engine pistons, a fuel inlet valve in the latter operable by the main shaft, a scavenging-air-pump communicating with the engine cylinder including an auxiliary piston connected with one of the engine pistons, and an air valve operable by the main shaft for controlling the supply of air to the air pump.

6. In a crankless engine of the type specified, a main shaft, a pair of slant members mounted on said shaft and inclined thereto, being each symmetrical with respect to its line of greatest inclination to the shaft, a working cylinder containing two pistons coacting severally with said slant members, said pistons being in phases of motion in the cylinder slightly differing from direct opposition to each other due to the line of greatest inclination of one slant being displaced slightly from direct opposition to that of the other.

7. In a crankless engine of the type specified, a main shaft, a pair of slant-members mounted on said shaft and inclined thereto, each being symmetrical with respect to its line of greatest inclination, a working cylinder containing two pistons, each coacting with one of said slant members and having exhaust and scavenge ports controlled by said pistons, said pistons being in slightly different phases with respect to their respective controlled ports so as to uncover said scavenge ports during a period shorter than, and retarded with respect to, the period of uncovering said exhaust ports.

8. In a crankless engine, a shaft, a pair of slant members mounted thereon with different phases of inclination, a cylinder, and a pair of oppositely acting pistons in said cylinder, each piston coacting with one of said slant members, each of said slants being so inclined to the shaft and so constructed and arranged that successive displacements of the piston coacting therewith as the slant moves through its cycle of movement will fall on a sinusoidal curve in which angular displacements of the slant are plotted against linear displacements of the piston.

9. In a crankless engine, a shaft, a pair of slant members mounted thereon with different phases of inclination, a cylinder, and a pair of oppositely acting pistons in said cylinder, each piston coacting with one of said slant members, each of said slants being so inclined to the shaft and so constructed and arranged that successive displacements of the piston coacting therewith as the slant moves through its cycle of movement will fall on a sinusoidal curve in which angular displacements of the slant are plotted against linear displacements of the piston, said slants being slightly angularly offset to operate out of phase with each other.

10. In a crankless engine, a shaft, a pair of slant members mounted thereon with different phases of inclination, a cylinder, and a pair of oppositely acting pistons in said cylinder, each piston coacting with one of said slant members, each of said slants being so inclined to the shaft and so constructed and arranged that successive displacements of the piston coacting therewith as the slant moves through its cycle of movement will fall on a sinusoidal curve in which angular displacements of the slant are plotted against linear displacements of the piston, said cylinder having exhaust ports controlled by one of the pistons and air admission ports controlled by the other piston.

11. In a crankless engine, a shaft, a pair of slant members mounted thereon with different phases of inclination, a cylinder, a pair of oppositely acting pistons in said cylinder, each piston coacting with one of said slant members, each of said slants being so inclined to the shaft and so constructed and arranged that successive displacements of the piston coacting therewith as the slant moves through its cycle of movement will fall on a sinusoidal curve in which angular displacements of the slant are plotted against linear displacements of the piston, fuel compression means operatively connected to one of said pistons, and air compression means operatively connected to the other piston.

12. In a crankless engine, a shaft, a pair of slant members mounted thereon with different phases of inclination, a cylinder, and a pair of oppositely acting pistons in said cylinder, each piston coacting with one of said slant members, each of said slants being so inclined to the shaft and so constructed and arranged that successive displacements of the pistons coacting therewith as the slant moves through its cycle of movement will fall on a sinusoidal curve in which angular displacements of the slant, are plotted against linear displacements of the piston, said cylinder having exhaust ports controlled by one of the pistons and air admission ports controlled by the other piston, said pistons being in slightly different phases with respect to their respective controlled ports so as to uncover said scavenge ports during a period shorter than, and retarded with respect to, the period of uncovering said exhaust ports.

In witness whereof, I have hereunto set my hand this 2nd day of January, 1929.

ANTHONY G. M. MICHELL.